(12) United States Patent
Edwards

(10) Patent No.: US 9,454,757 B2
(45) Date of Patent: Sep. 27, 2016

(54) POINT-OF-SALE (POS) DIRECT SUPPORT OF SELF-CHECKOUT

(75) Inventor: Thomas V. Edwards, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 136 days.

(21) Appl. No.: 13/334,253

(22) Filed: Dec. 22, 2011

(65) Prior Publication Data

US 2013/0191230 A1    Jul. 25, 2013

(51) Int. Cl.
| | | |
|---|---|---|
| *G06Q 20/00* | (2012.01) | |
| *G06Q 20/20* | (2012.01) | |
| *G07G 1/00* | (2006.01) | |

(52) U.S. Cl.
CPC ............ *G06Q 20/20* (2013.01); *G07G 1/0009* (2013.01)

(58) Field of Classification Search
CPC ...... G06Q 20/20; G06Q 30/06; G06Q 30/02; G06Q 20/204; G07G 1/12
USPC .......................................................... 705/16
See application file for complete search history.

(56) References Cited

U.S. PATENT DOCUMENTS

| | | | | |
|---|---|---|---|---|
| 7,349,871 B2* | 3/2008 | Labrou | .................. | G06Q 20/02 705/26.35 |
| 7,620,568 B1* | 11/2009 | Parker-Malchak | .. | G06Q 10/087 235/375 |
| 7,845,554 B2* | 12/2010 | Jacobs | .................. | G06Q 20/20 235/383 |

\* cited by examiner

*Primary Examiner* — Garcia Ade
(74) *Attorney, Agent, or Firm* — Schwegman, Lundberg & Woessner

(57) ABSTRACT

Techniques for Point-Of-Sale (POS) direct support of Self Checkout (SCO) are provided. A checkout station is configured with software to support two different interfaces and workflows: one interface and workflow supporting SCO on the checkout station and the other interface and the other workflow supporting assisted checkout operation. The checkout station can be dynamically switched between the two modes of operation, such that the checkout station is usable within an enterprise for both cashier assisted operations for customers and for self-service checkout operations performed by customers without assistance.

19 Claims, 4 Drawing Sheets

POINT-OF-SALE (POS) DIRECT SUPPORT OF SELF-CHECKOUT

BACKGROUND

Consumers are increasingly using automated mechanisms to perform every day transactions. Kiosks exist to avoid enterprise personnel and lines. These automated kiosks allow consumers to perform transactions with an enterprise or agency with little to no human intervention.

The general availability of retail self-checkout systems has naturally led to taking any and all measures practical to increase utilization of these cost effective systems, and maximize the throughput at these systems.

One issue with deployment of self-service checkout stations is that generally the hardware and the software support one mode of operation, which is a workflow and interface directed to customer-based checkouts. Similarly, cashier-assisted checkout stations include rigid hardware and software configurations. The result is that a lot of hardware duplication exists in retail establishments and many times the hardware is underutilized.

Self-Check Out (SCO) applications today are built by leveraging the underlying business rules contained in a Point-Of Sale (POS) interfaced to a separate SCO wrapper application, which provides the SCO experience while hiding nuances of the underlying POS. While this approach benefits from reuse of the complex POS business rules for pricing, taxing and the like, it suffers from the need to keep two distinct workflows synchronized; one from the SCO activity and the second from the POS application.

This traditional approach also complicates solution development and testing of each of the SCO application and the POS application, which use different device interface layers, different User Interface (UI) engines and rely on an interface definition between the POS and the SCO wrapper.

This interface may be direct and intended by the POS or it may be unintended where the SCO wrapper emulates devices and screen interactions of the POS to accomplish the SCO activities.

SUMMARY

In various embodiments, techniques for Point-Of-Sale (POS) direct support of SCO are presented. According to an embodiment, a method for POS direct support of a SCO station is discussed.

Specifically, a first interface associated with a first mode of operation for a checkout station is created and then associated with a first workflow for first actions to perform in response to first selections made on the first interface during the first mode of operation. Next, a second interface associated with a second mode of operation for the checkout station is created and then associated with a second workflow for second actions to perform in response to second selections made on the second interface during the second mode of operation. Finally, the first and second interfaces and the first and second workflows are ported to the checkout station.

DETAILED DESCRIPTION

Figure 1:
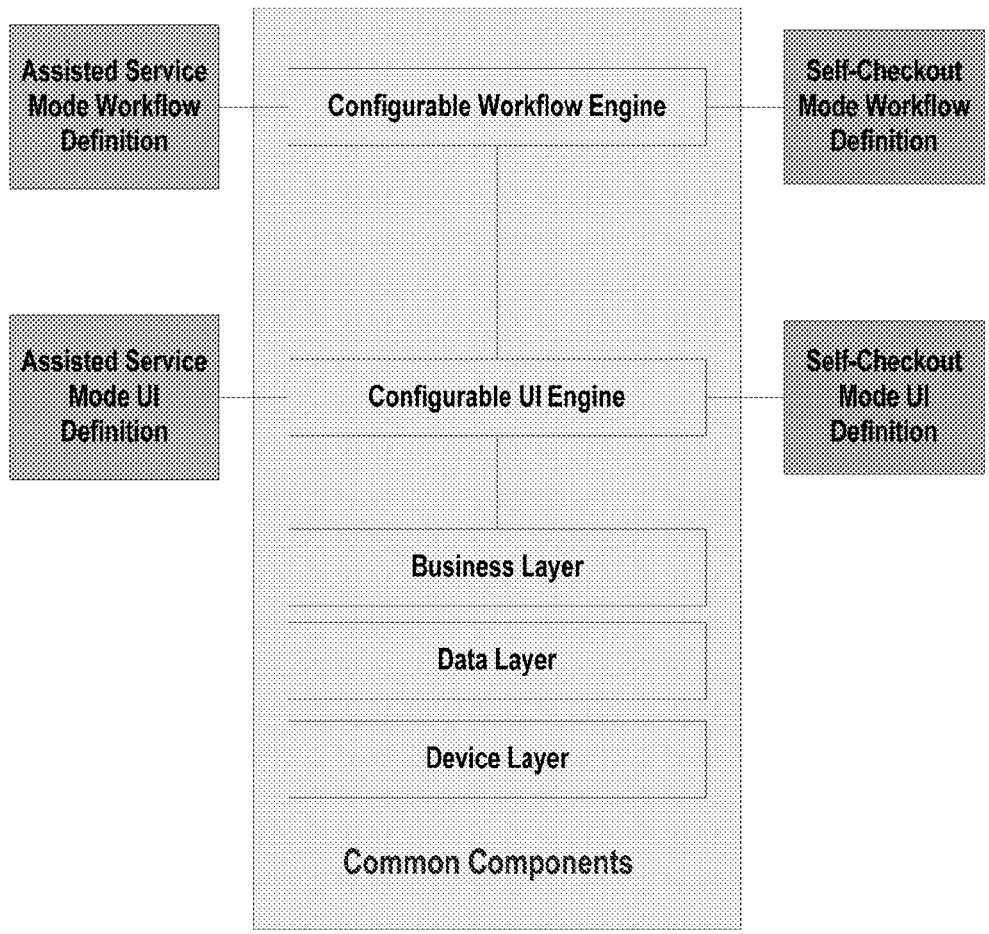
FIG. 1 is a diagram of an architecture for POS direct support SCO is provided, according to an example embodiment.

FIG. 1 is a diagram of an architecture for POS direct support SCO is provided, according to an example embodiment. The components of the architecture are implemented in hardware devices of checkout stations. That is, each component resides in a non-transitory computer-readable medium and is executed on one or more processors of the hardware devices that comprise the checkout stations.

The diagram of the FIG. 1 is presented for purposes of illustration and comprehension as other arrangements can be achieved without departing from the beneficial teachings presented herein and below.

Now referring to the FIG. 1 and its components.

As POS applications become more flexible and isolate their UI's and Workflow layers, it becomes possible for the POS to eliminate the interface and SCO wrapper and directly implement SCO functionality via a distinct mode of operation.

A POS with a SCO "mode" selects an alternate workflow and UI representation to implement only the operations required for the customer at SCO, plus provides a reserved (authorization required) secondary mode of operation for cashier operations to support the self-checkout activities (assisted checkout workflow operations).

The SCO mode may be established by installing configuration settings so as to allow the POS to understand that the SCO mode is to be entered at startup on a particular lane (particular checkout station equipment), while another lane (other checkout station equipment) starts the POS in traditional assisted service mode (cashier manned).

In another implementation, the POS has the ability to change its operating mode between "Assisted (cashier manned)" and "Unassisted (customer driven)" at runtime without restarting the application. This can be valuable when the lane hardware is "convertible" between assisted and unassisted operation depending on the store load and preferences of the store management.

The advantage of the solutions presented herein is that complex business elements of the POS (e.g. pricing, taxation, device handling, etc.) are able to be reused without requiring an interface (intended or otherwise) to an external SCO application. This greatly simplifies the implementation of the self-service mode because the SCO operations and associated POS operations are directly implemented by a same workflow. This eliminates the complexity of maintaining synchronization between separate POS workflows and SCO workflows through an interface.

Testing is also simplified because same business logic is used on both cases. Therefore, the unit level testing is substantially the same for both assisted and unassisted modes. Additional code units may be added to support either mode such as item weight security in the SCO mode and department/item management in the assisted mode. Some features like cash management can be substantially the same in both the assisted and non-assisted modes.

Payment Card Industry (PCI)/Data Security Standard (DSS), Fiscal and Weights and Measures certifications are simplified as it is the same application using running in different modes.

Moreover, reuse of common devices is achievable for: a receipt printer, a Magnetic Stripe Reader (MSI), a pin pad and a touch screen, and the like. Different devices can also exist in the assisted and SCO modes, such as the use of a security bag scale. Reuse of software components such as tracing/logging, centralized management, remote support, etc. also provides increased value for the techniques presented herein.

Figure 2:
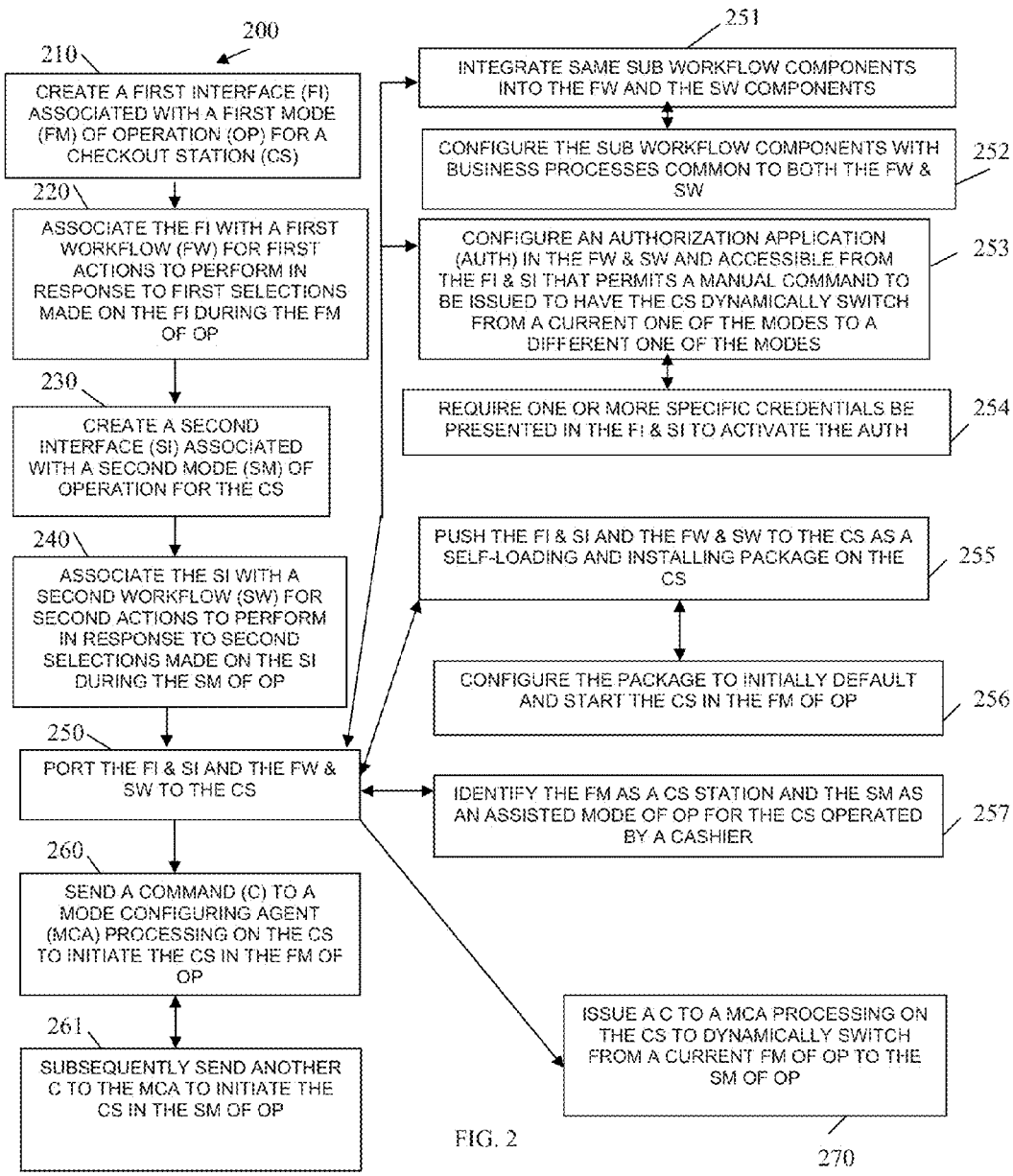
FIG. 2 is a diagram of a method for POS direct support of a SCO station, according to an example embodiment.

FIG. 2 is a diagram of a method 200 for POS direct support of a SCO station, according to an example embodiment. The method 100 (hereinafter "mode configuring manager") is implemented as instructions programmed and residing on a non-transitory computer-readable (processor-readable) storage medium and executed by one or more processors. The processors are specifically configured and programmed to process the mode configuring manager. In an embodiment, the mode configuring manager may operate over a network. The network is wired, wireless, or a combination of wired and wireless.

In an embodiment, the mode configuring manager executes on a server device to process configurations of checkout systems and supporting equipment. Agents of the mode configuring manager can execute on checkout systems to assist in effectuating a configuration and/or dynamically switching between configurations.

At 210, the mode configuring manager creates a first interface associated with a first mode of operation for a checkout station. By create is meant that the mode configuring manager modifies and assembles as a plugin UI module any existing enterprise first interface, such as a self-service checkout interface or a cashier-assisted checkout interface. The first interface is not directly tied to a particular device or particular workflow.

At 220, the mode configuring manager associates the first interface with a first workflow of operations for first actions to perform in response to first selections made on the first interface during the first mode of operation.

At 230, the mode configuring manager creates a second interface associated with a second mode of operation for the checkout station. Again, the second interface is modular and is not directly tied to any particular hardware or workflow at this point.

At 240, the mode configuring manager associates the second interface with a second workflow for second actions to perform in response to second selections made on the second interface during the second mode of operation.

At 250, the mode configuring manager ports the first interface and the second interface and the first and second workflows to the checkout station.

According to an embodiment, at 251, the mode configuring manager integrates same sub workflow components into the first workflow and the second workflow components. In other words, common layered processing that is common to both the first and second workflows are included in the first and second workflows.

Continuing with the embodiment of 251 and at 252, the mode configuring manager configures the sub workflow components with business processes common to both the first workflow and the second workflow.

Still continuing with the embodiment of 251 and at 253, the mode configuring manager configures an authorization application in the first workflow and the second workflow and accessible from the first interface and the second interface that permits a manual command to be issued to have the checkout station dynamically switch from a current one of the modes to a different one of the modes.

Continuing with the embodiment of 253 and at 254, the mode configuring manager requires that one or more specific credentials be presented in the first interface and the second interface to activate the authorization application.

In another embodiment, at 255, the mode configuring manager pushes the first and second interfaces and the first and second workflows as a self-loading and installing package on the checkout station.

Continuing with the embodiment of 255 and at 256, the mode configuring manager configures the package to initially default and start the checkout station in the first mode of operation.

In another scenario, at 257, the mode configuring manager identifies the first mode as a self-service mode of operation and the second mode of operation as a cashier-assisted mode of operation for the checkout station.

At 260, the mode configuring manager sends a command to a mode configuring agent processing on the checkout station for purposes of initiating the checkout station in the first mode of operation.

Continuing with the embodiment of 260 and at 261, the mode configuring manager subsequently sends another command to the mode configuring agent (discussed below with reference to the FIG. 3) for purposes of initiating the checkout station in the second mode of operation.

In still another situation, at 270, the mode configuring manager issues a command to a mode configuring agent processing on the checkout station to dynamically switch from a current first mode of operation to the second mode of operation.

Figure 3:
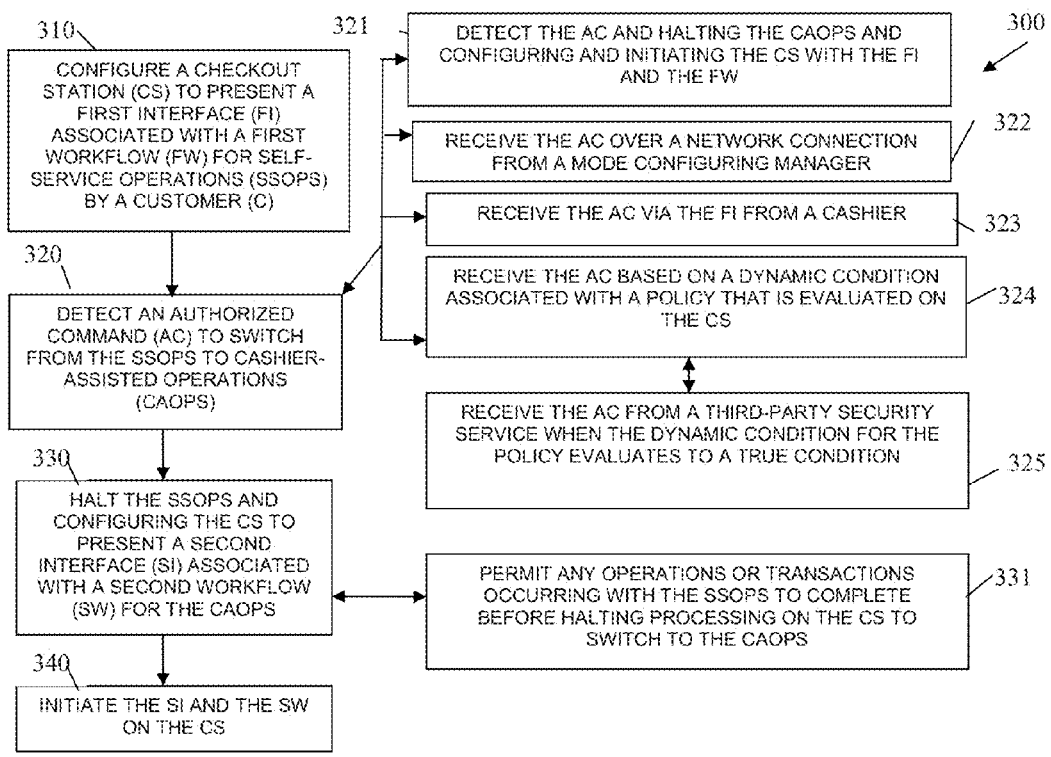
FIG. 3 is a diagram of another method for POS direct support of a SCO station, according to an example embodiment.

FIG. 3 is a diagram of another method 300 for POS direct support of a SCO station, according to an example embodiment. The method 200 (hereinafter "mode configuring agent") is implemented as instructions and programmed within a non-transitory computer-readable (processor-readable) storage medium that executes on one or more processors of a SCO station, the processors of the SCO station are specifically configured to execute the mode configuring agent. In an embodiment, the mode configuring agent is operational over a network; the network is wired, wireless, or a combination of wired and wireless.

The mode configuring agent describes processing actions from the perspective of self checkout system or kiosk that a customer or cashier (depending upon the mode) is interacting with at an enterprise to complete a transaction with that enterprise. The mode configuring agent interacts with the mode configuring manager of the FIG. 2.

At 310, the mode configuring agent configures a checkout station to present a first interface associated with a first workflow for self-service operations by a customer on a checkout station.

At 320, the mode configuring agent detects an authorized command to switch from the self-service operations to cashier-assisted operations.

According to an embodiment, at 321, the mode configuring agent detects the authorized command a second time and halts the cashier-assisted operations and configures and initiates the checkout station with the first interface and the first workflow.

In an embodiment, at 322, the mode configuring agent receives the authorized command over a network connection from a mode configuring manager, such as the mode configuring manager discussed above with reference to the FIG. 2.

In another scenario, at 323, the mode configuring agent receives the authorized command via the first interface from a cashier.

Alternatively, at 324, the mode configuring agent receives the authorized command based on a dynamic condition associated with a policy that is evaluated on the checkout station.

Continuing with the embodiment of 324 and at 325, the mode configuring agent receives the authorized command from a third-party security service when the dynamic condition for the policy evaluates to a true condition.

At 330, the mode configuring agent halts or suspends temporarily the self-service operations and configures the checkout station to present a second interface associated with a second workflow for the cashier-assisted operations.

According to an embodiment, at 331, the mode configuring agent permits any operations or transaction occurring with the self-service operations to complete before halting the processing on the checkout station to switch over to the cashier-assisted operations on the checkout station.

At 340, the mode configuring agent initiates the second interface and the second workflow on the checkout station.

Figure 4:
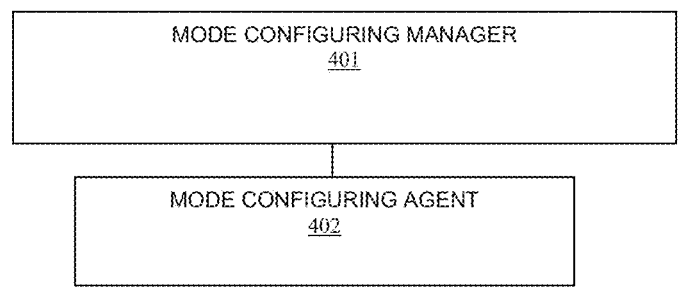
FIG. 4 is a diagram of a POS direct support of SCO system, according to an example embodiment.

FIG. 4 is a diagram of a POS direct support of SCO system 400, according to an example embodiment. The POS direct support of SCO system 400 includes one or more processors that are specifically configured to perform, inter alia, the processing associated with the methods 200 and 300 of the FIGS. 2 and 3, respectively. Furthermore and in an embodiment, the POS direct support of SCO system 400 is operational over a network and the network can be wired, wireless, or a combination of wired and wireless.

The POS direct support of SCO system 400 includes a mode configuring manager 401 and one or more mode configuring agents 402. Each of these and their interactions with one another will now be discussed in turn.

A server includes the mode configuring manager 401; the server is a physical machine or a Virtual Machine (VM) accessible over a network, such as an enterprise server. In some cases the mode configuring manager 401 is accessible via one or more cloud processing environments. Example processing associated with the mode configuring manager 401 was presented above with reference to the FIG. 2.

The mode configuring manager 401 is configured to port a first interface having a first workflow of operations and a second interface having a second workflow of operations to the checkout station.

A checkout station includes the mode configuring agent 402, which is implemented, programmed, and resides within a non-transitory computer-readable storage medium and executes on a SCO device/station (checkout station) for a checkout system. Example processing associated with the mode configuring agent 402 was presented above in detail with respect to the method 300 of the FIG. 3.

The mode configuring agent 402 is configured to determine when to initiate the first interface and the first workflow and when to initiate the second interface and the second workflow.

According to an embodiment, the first interface and the first workflow are associated with self-service checkout operations performed in an unassisted manner by a customer of an enterprise and the second interface and the second workflow are associated with cashier-assisted checkout operations performed by a cashier to assist the customer in checking out of the enterprise during a transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for dynamically switching a Self-Checkout (SCO) station between a self-service mode of operation conducted by a customer and an assisted mode of operation conducted by a cashier, the method programmed in a non-transitory processor-readable medium as executable instructions that are executed by one or more hardware processors configured to execute the method, comprising:
    creating, by the one or more hardware processors, a first interface associated with a first mode of operation for the SCO station;
    associating, by the one or more hardware processors, the first interface with a first workflow for first actions to perform in response to first selections made on the first interface during the first mode of operation, the first mode of operation is a customer-driven SCO station operations;
    creating, by the one or more hardware processors, a second interface associated with a second mode of operation for the SCO station, wherein the SCO station configured to identify and process one of the first and second modes of operations during startup of the SCO station based on configuration settings for the SCO station;
    associating, by the one or more hardware processors, the second interface with a second workflow for second actions to perform in response to second selections made on the second interface during the second mode of operation, the second mode of operation is a cashier-driven customer checkout operations for the SCO station; and
    porting, by the one or more hardware processors, the first and second interfaces and the first and second workflows to the SCO station, and dynamically switching, by the SCO station, between the first and second workflows for the customer-driven SCO station operations when the SCO station is operated by the customer for the first mode of operation as the self-service mode of operation and the cashier-driven customer checkout operations when the SCO station is operated by the cashier for the second mode of operation as the assisted mode of operation.

2. The method of claim 1 further comprising, sending a command to a mode configuring agent processing on the SCO station to initiate the SCO station in the first mode of operation.

3. The method of claim 2 further comprising, subsequently sending another command to the mode configuring agent to initiate the SCO station in the second mode of operation.

4. The method of claim 1 further comprising, issuing a command to a mode configuring agent processing on the SCO station to dynamically switch from a current first mode of operation to the second mode of operation.

5. The method of claim 1, wherein porting further includes integrating same sub workflow components into the first workflow and the second workflow components.

6. The method of claim 5, wherein integrating further includes configuring the sub workflow components with business processes common to both the first and the second workflows.

7. The method of claim 1, wherein porting further includes configuring an authorization application in the first and second workflows and accessible from the first and second interfaces that permits a manual command to be issued to have the SCO station dynamically switch from a current one of the modes to a different one of the modes.

8. The method of claim 7, wherein configuring further includes requiring one or more specific credentials be presented in the first and the second interfaces to activate the authorization application.

9. The method of claim 1, wherein porting further includes pushing the first and second interfaces and the first and second workflows to the SCO station as a self-loading and installing package on the SCO station.

10. The method of claim 9, wherein pushing further includes configuring the package to initially default and start the SCO station in the first mode of operation.

11. A method for dynamically switching a Self-Checkout (SCO) station between a self-service mode of operation conducted by a customer and an assisted mode of operation conducted by a cashier, the method programmed in a non-transitory processor-readable medium as executable instructions that are executed by one or more hardware processors configured to execute the method, comprising:
configuring, by the one or more hardware processors, the SCO station to present a first interface associated with a first workflow for self-service operations by the customer performing a checkout by operating the SCO station, and wherein the self-service operations represent the self-service mode of operation for the SCO station, and wherein the configuring occurs during startup of the SCO station based on configuration settings for the SCO station;
detecting, by the one or more hardware processors, an authorized command for dynamically switching from the self-service operations to cashier-assisted operations that represent the assisted mode of operation for the SCO station;
halting, by the one or more hardware processors, the self-service operations and configuring the SCO station to present a second interface associated with a second workflow for the cashier-assisted operations for the checkout; and
dynamically initiating, by the one or more hardware processors, the second interface and the second workflow on the SCO station dynamically switching from the first workflow to the second workflow on the SCO station.

12. The method of claim 11 further comprising, detecting the authorized command and halting the cashier assisted operations and configuring and initiating the SCO station with the first interface and the first workflow.

13. The method of claim 11, wherein detecting further includes receiving the authorized command over a network connection from a mode configuring manager.

14. The method of claim 11, wherein detecting further includes receiving the authorized command via the first interface from the cashier.

15. The method of claim 11, wherein detecting further includes receiving the authorized command based on a dynamic condition associated with a policy that is evaluated on the SCO station.

16. The method of claim 15, wherein receiving further includes receiving the authorized command from a third-party security service when the dynamic condition for the policy evaluates to a true condition.

17. The method of claim 11, wherein halting further includes permitting any operations or transactions occurring with the self-service operations to complete before halting processing on the SCO station to switch to cashier assisted operations.

18. A system for dynamically switching a checkout station between a self-service mode of operation conducted by a customer and an assisted-mode of operation conducted by a cashier, comprising:
a hardware server having executable instructions residing in a non-transitory computer-readable medium as a mode configuring manager that executes on one or more hardware processors of the hardware server; and
the checkout station having executable instructions residing in a non-transitory computer-readable storage medium as a mode configuring agent that executes on one or more processors of the checkout station, the mode configuring agent configured during startup of the checkout station to place the checkout station in a specific mode of operation based on configuration settings for the checkout station;
the mode configuring manager configured to: i) port a first interface to the checkout station and the first interface having a first workflow of operations for customer-driven self-service checkouts conducted by the customer, wherein the customer-driven self-service checkouts represent the self-service mode of operation for the checkout station, and ii) to port a second interface to the checkout station and the second interface having a second workflow of operations for cashier-driven customer checkouts, wherein the cashier-driven customer checkouts represent the assisted-mode of operation for the checkout station, and the mode configuring agent configured to: i) determine when to dynamically initiate the first interface and the first workflow within the checkout station, ii) determine when to dynamically initiate the second interface and the second workflow within the checkout station, and iii) dynamically switching between the first workflow when the first interface is dynamically initiated on the checkout station and the second workflow when the second interface is dynamically initiated on the checkout station.

19. The system of claim 18, wherein the first interface and the first workflow are associated with self-service checkout operations performed in an unassisted manner by the customer of an enterprise and the second interface and the second workflow are associated with cashier-assisted checkout operations performed by the cashier to assisted the customer in checking out of the enterprise during a transaction.

* * * * *